July 22, 1941.  H. KLEMPERER  2,250,102
CONDENSER CHARGING SYSTEM
Filed July 18, 1940
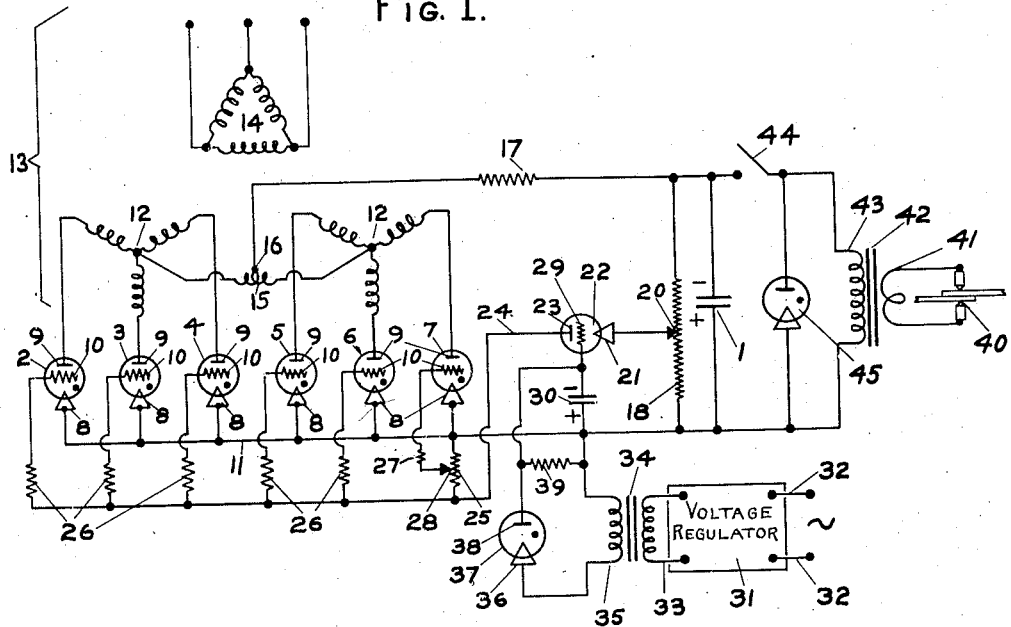
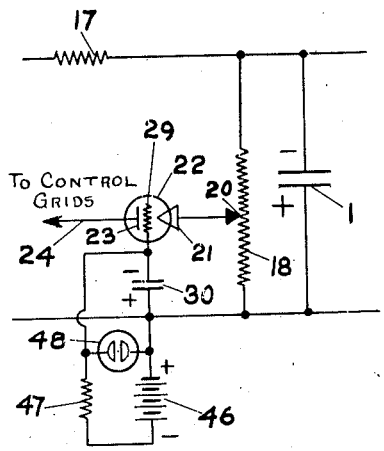
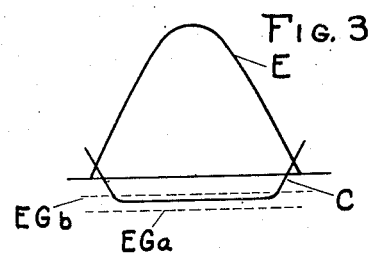
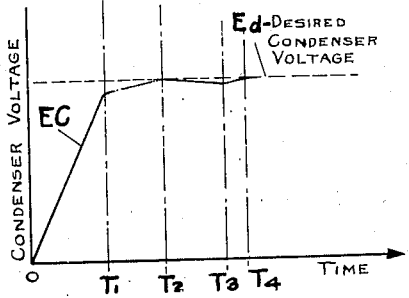
INVENTOR.
HANS KLEMPERER,
BY Elmer J. Gorn
ATTY.

Patented July 22, 1941

2,250,102

UNITED STATES PATENT OFFICE 2,250,102

CONDENSER CHARGING SYSTEM

Hans Klemperer, Belmont, Mass., assignor to Raytheon Manufacturing Company, Newton, Mass., a corporation of Delaware Application July 18, 1940, Serial No. 346,237

8 Claims. (Cl. 171—97)

This invention relates to a system for charging a condenser to a predetermined voltage. The charge on such a condenser may be used for any convenient purpose, such as resistance welding.

An object of this invention is to charge the condenser at a rapid rate and to automatically terminate the charging current when the desired voltage is reached.

A further object is to change the charging rate as the desired voltage is approached so as to prevent overcharging of the condenser.

Another object is to provide means for supplying small implements of charge to the condenser to compensate for leakage losses therefrom.

A still further object is to accomplish the foregoing in an accurate yet simple and reliable manner.

The foregoing and other objects of this invention will be best understood from the following description of an exemplification thereof, reference being had to the accompanying drawing, wherein:

Fig. 1 is a diagram of a system embodying my invention;

Fig. 2 is a fragmentary diagram of a variation of the arrangement shown in Fig. 1; and Figs. 3 and 4 are curves showing certain operating characteristics of the system illustrated in Fig. 1.

The system illustrated in Fig. 1 consists of a condenser 1 which is to be charged to a predetermined voltage. The charging current for the condenser is supplied from a plurality of controlled rectifiers 2—7. These controlled rectifiers may be of the gas or vapor-filled type having a control grid to determine the initiation of the discharge during a period when the anode is positive. Each of the rectifiers 2—7 contains a cathode 8 of the permanently-energized type, such as a thermionic filament, an anode 9, and a control grid 10. The cathodes 8 are connected to a common conductor 11 which in turn is connected to the positive side of the condenser 1. The anodes 9 are fed from a source of multiple-phase alternating current by being connected to the outer ends of the phase windings of two Y-connected secondary windings 12 of a transformer 13 having a delta-connected primary winding 14. The primary winding 14 is adapted to be energized from a three-phase alternating current line. The neutral points of the two secondary windings 12 are connected together through an interphase reactor 15 having a center tap 16 connected through a current-limiting resistor 17 to the negative side of the condenser 1. The resistor 17 is of such a value as to prevent an excessive charging rate of the condenser 1.

Across the condenser 1 is connected a potentiometer 18 which is provided with an adjustable tap 20 connected to the cathode 21 of a high vacuum tube 22 having an anode 23 connected to a conductor 24. The conductor 11 is connected to the conductor 24 through a resistance 25. Also each of the control grids 10 of the rectifiers 2—6 is connected to the conductor 24 through a relatively high resistance 26. The control grid 10 of the rectifier tube 7 is connected through a relatively high resistance 27 to a tap 28 on the resistance 25.

The tube 22 is provided with a control grid 29 connected through a condenser 30 to the conductor 11. The condenser 30 has impressed upon it a constant reference voltage supplied from some suitable constant voltage source. As illustrated, this constant voltage source may consist of a voltage regulator 31 energized through leads 32 from a source of alternating current. The voltage regulator is of any suitable type which maintains the voltage at its output terminals substantially constant, independent of variations in line voltage applied to the leads 32. The output of the voltage regulator 31 supplies the primary winding 33 of a transformer 34 having a secondary winding 35. One side of the secondary winding is connected to the conductor 11, and the other side is connected to the cathode 36 of a rectifier tube 37 whose anode 38 is connected to the control grid 29 which constitutes the negative side of the condenser 30. The rectifier tube 37 may be of any suitable type, such as vapor-filled rectifier having a thermionic cathode. In order to properly load the rectifier 37, a resistance 39 is connected across the condenser 30.

As previously stated, the energy stored in the condenser 1 may be used for any suitable purpose, as, for example, a resistance welding load 40. This load may be connected to the secondary winding 41 of a welding transformer 42 having a primary winding 43 which may be connected to the charged condenser 1 through a welding control switch 44. A high current rectifier tube 45 may be connected across the primary winding 43 for the purpose described and claimed in the copending application of John W. Dawson, Serial No. 309,124, filed December 14, 1939.

The operation of the system illustrated in Fig. 1 may be more readily understood by referring to the curves of Figs. 3 and 4. In Fig. 3 E represents the voltage applied to any one of the anodes 9; C represents the grid characteristic curve of the associated controlled rectifier tube. If the voltage on the associated grid rises above C, the tube fires, while if the grid voltage is below the curve C, the tube remains in a non-conducting condition. In Fig. 4 the curve EC represents the voltage across the condenser 1, while the dotted line $E_d$ represents the desired voltage to which the condenser is to be charged.

When the system is energized initially, the condenser 1 has no charge upon it, so that the grids 10 are substantially at cathode potential, and therefore the tubes 2—7 start conducting current substantially whenever the anodes 9 become positive. Under these conditions a maximum amount of charging current is supplied to the condenser 1, and said condenser charges rapidly, as indicated by the curve EC between zero and $T_1$ in Fig. 4. During this time the voltage on the cathode 21 of the tube 22 becomes more and more negative. The characteristics of the tube 22 are such that the voltage on the grid 29 prevents any appreciable flow of current through said tube until the voltage across the condenser 1 has almost risen to the desired value. Furthermore, when the tube 22 does start conducting current, the characteristics thereof are relatively sharp so that a substantial amount of current flows. Thus, at the time $T_1$, the tube 22 starts to conduct current, causing a substantial voltage drop to appear across the resistance 25. This voltage, which may be represented by the dotted line $EG_a$ in Fig. 3, is impressed upon the control grids 10 of tubes 2—6, so that these tubes stop conducting current, resulting in a considerably diminished flow of charging current to the condenser 1. The control grid 10 of tube 7, however, does not have impressed upon it the full voltage appearing across the resistance 25, but only a portion thereof, as determined by the setting of the tap 28. Therefore, when the voltage $EG_a$ on the grids 10 of the tubes 2—6 is sufficient to extinguish said tubes, a lesser value of voltage $EG_b$, illustrated by the upper dotted line in Fig. 3, is impressed upon the control grid 10 of tube 7, and therefore said tube continues to conduct current after the tubes 2—6 have been extinguished. After the time $T_1$, therefore, only the tube 7 supplies charging current to the condenser 1, and the voltage $E_c$ on said condenser approaches the final desired value $E_d$ at a diminished rate between the times $T_1$ and $T_2$. During this period the voltage across the resistance 25 is increased, and likewise the negative bias on the control grid 10 of tube 7 is increased, so that at the time $T_2$, the control grid of tube 7 is sufficiently negative so as to extinguish said tube, terminating all flow of charging current to the condenser.

Usually the condenser 1 has some leakage so that after the time $T_2$, the voltage $E_c$ gradually decreases. This decrease in voltage is accompanied by a corresponding decrease in the voltage across resistance 25, and thus on the control grid 10 of tube 7. At a time $T_3$, the voltage on said control grid falls to a sufficient value so that the tube 7 again starts to conduct current, bringing the charge on the condenser 1 back to the value $E_d$ at a time $T_4$. It will be noted that in this operation the voltage on the grids 10 of tubes 2—6 always remain substantially greater than that on the grid 10 of tube 7, and thus these tubes remain extinguished despite the leakage of charge from the condenser 1. If all of the tubes 2—7 were permitted to come into operation when the voltage across the condenser 1 decreased slightly, there would be a tendency for the charge on said condenser to overshoot the value $E_d$, introducing undesirable results into the operation of the system.

Any time after the condenser 1 has been charged to its final value, the switch 44 is closed, discharging the energy of said condenser into the resistance welding load 40. When said condenser 1 has been substantially discharged, the operation of the system automatically restarts to again charge the condenser 1 at the rapid rate indicated by the curve $E_c$ between zero and $T_1$.

By adjusting the tap 20, the final value to which the condenser 1 is charged can be selected at will. Also if the voltage regulator 31 is adjustable, said regulator can be adjusted to select the value of voltage to which the condenser 1 is charged.

The arrangement shown in Fig. 1 illustrates one generalized type of voltage regulator. However, other types of constant reference voltage sources may be utilized. For example, in Fig. 2 there is illustrated a fragmentary part of the system shown in Fig. 1, with a different type of stabilized voltage source applied to the condenser 30. In Fig. 2 the same reference numerals are applied where the elements are identical with those shown in Fig. 1. In Fig. 2 a suitable source of direct current, such as a battery 46, is connected through a resistance 47 across a glow discharge regulator tube 48. This tube has the characteristic of maintaining constant voltage across its terminals for all values of discharge current through it within predetermined limits. Thus upon the application of the voltage of the battery 46 thereto, a definite stabilized voltage appears across the terminals of the glow tube 48, and this stabilized voltage is impressed across the condenser 30. The operation of the variation illustrated in Fig. 2 is identical with that described above in connection with Fig. 1.

Of course it is to be understood that this invention is not limited to the particular details described above as many equivalents will suggest themselves to those skilled in the art. It is accordingly desired that the appended claims be given a broad interpretation commensurate with the scope of this invention within this art.

What is claimed is:

1. In combination, a condenser, a source of charging current for charging said condenser, a stabilized reference voltage source, and means responsive to the ratio between the voltage on said condenser and said reference voltage for cutting off the supply of charging current to said condenser when said ratio reaches a predetermined value.

2. In combination, a condenser, rectifying means adapted to be energized from a source of alternating current for supplying charging current to said condenser, said rectifying means comprising a rectifying space discharge tube through which the discharge is controlled by a control electrode, a stabilized reference voltage source, and means responsive to the ratio between the voltage on said condenser and said reference voltage for supplying a discharge-blocking potential to said control electrode to cut off the supply of charging current to said condenser when said ratio reaches a predetermined value.

3. In combination, a condenser, rectifying means adapted to be energized from a source of alternating current for supplying charging current to said condenser, said rectifying means comprising a rectifying space discharge tube through which the discharge is controlled by a control electrode, a continuous control type tube having a pair of electrodes upon which a voltage proportional to the voltage across said condenser is impressed and a control electrode for controlling the discharge between said pair of electrodes, means for impressing a reference voltage on the last-named control electrode, and means responsive to the current flowing through said last-named tube for impressing a discharge-inhibiting voltage on the first-named control electrode, said last-named tube being adapted to conduct a sufficient amount of current to cause a substantial current to flow through it when the voltage across said condenser has risen to a predetermined value.

4. In combination, a condenser, rectifying means adapted to be energized from a value of alternating current for supplying charging current to said condenser, said rectifying means comprising a gas or vapor-filled rectifying space discharge tube through which the discharge is controlled by a control electrode, a continuous control type tube having a pair of electrodes upon which a voltage proportional to the voltage across said condenser is impressed and a control electrode for controlling the discharge between said pair of electrodes, means for impressing a reference voltage on the last-named control electrode, and means responsive to the current flowing through said last-named tube for impressing a discharge-inhibiting voltage on the first-named control electrode, said last-named tube being adapted to conduct a sufficient amount of current to cause a substantial current to flow through it when the voltage across said condenser has risen to a predetermined value.

5. In combination, a condenser, rectifying means adapted to be energized from a source of alternating current for supplying charging current to said condenser, said rectifying means comprising a rectifying space discharge tube through which the discharge is controlled by a control electrode, a continuous control type tube having a pair of electrodes upon which a voltage proportional to the voltage across said condenser is impressed and a control electrode for controlling the discharge between said pair of electrodes, means for impressing a stabilized reference voltage on the last-named control electrode, and means responsive to the current flowing through said last-named tube for impressing a discharge-inhibiting voltage on the first-named control electrode, said last-named tube being adapted to conduct a sufficient amount of current to cause a substantial current to flow through it when the voltage across said condenser has risen to a predetermined value.

6. In combination, a condenser, a source of charging current for charging said condenser comprising a plurality of rectifiers energized from a plurality of alternating current phases, and means responsive to predetermined voltages on said condenser for successively deenergizing said rectifiers.

7. In combination, a condenser, a source of charging current for charging said condenser comprising a plurality of rectifiers energized from a plurality of alternating current phases, means responsive to a predetermined voltage on said condenser for deenergizing at least one of said rectifiers, and means responsive to a higher predetermined voltage for deenergizing at least one additional rectifier.

8. In combination, a condenser, a source of charging current for charging said condenser comprising a plurality of rectifiers energized from a plurality of alternating current phases, means responsive to a predetermined voltage on said condenser for deenergizing at least one of said rectifiers, and means responsive to a higher predetermined voltage for deenergizing all of said rectifiers.

HANS KLEMPERER.